A. W. BAILEY.
WIND MOTOR.
APPLICATION FILED JAN. 15, 1909.

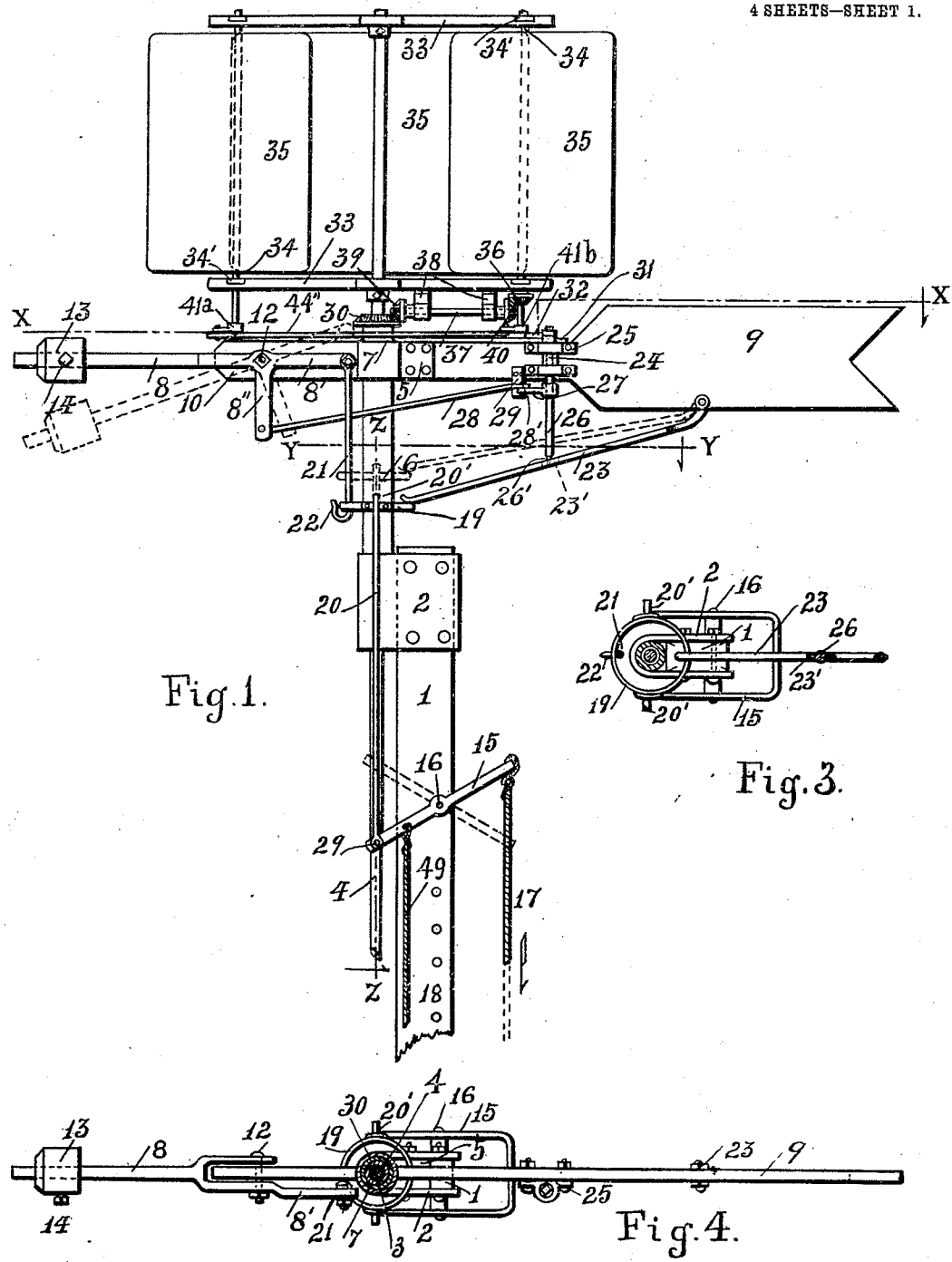

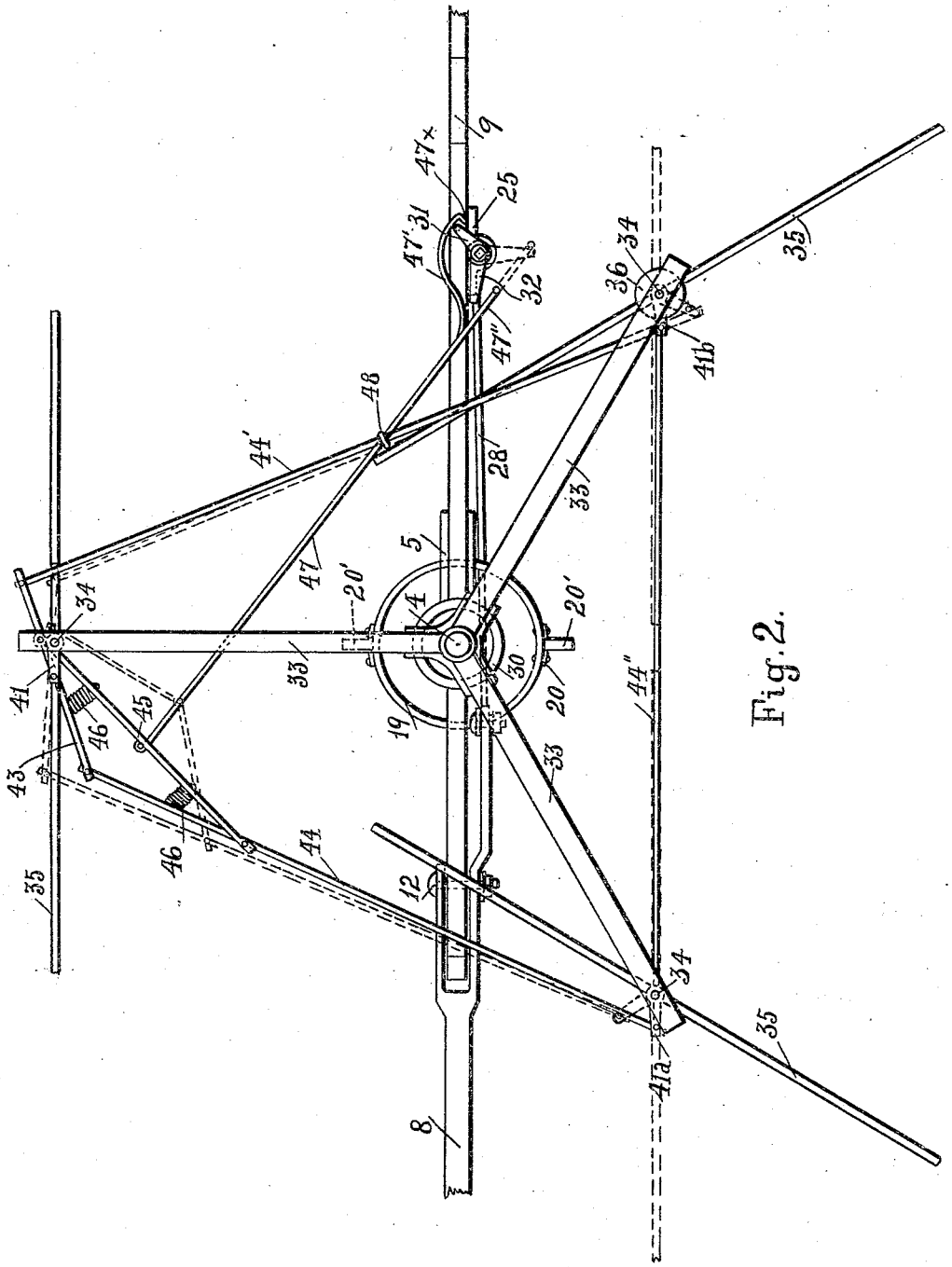

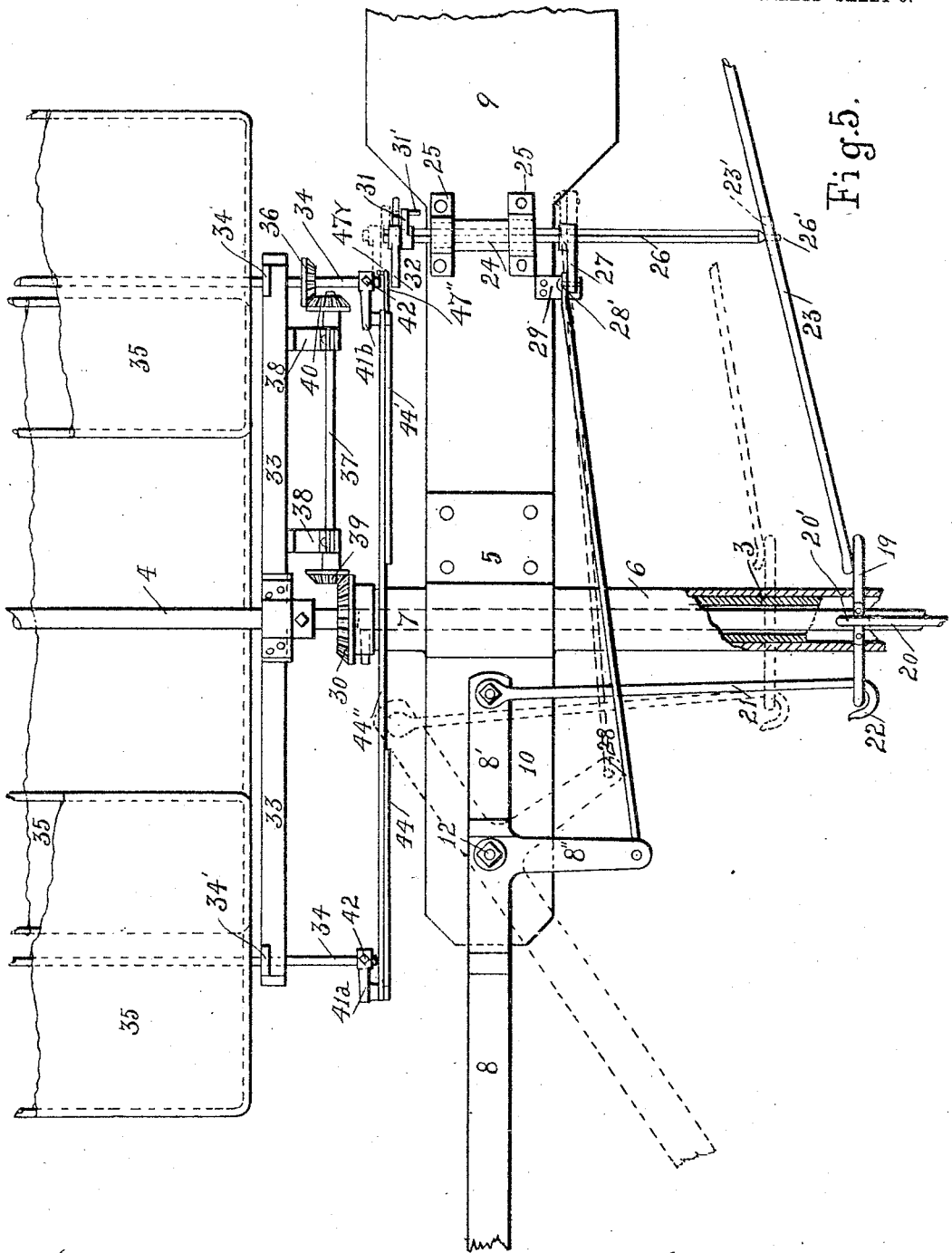

955,305.

Patented Apr. 19, 1910.

4 SHEETS—SHEET 4.

Witnesses.

Inventor.
ALBERT W. BAILEY.
By Atty

UNITED STATES PATENT OFFICE.

ALBERT W. BAILEY, OF STEWARDSON, ILLINOIS.

WIND-MOTOR.

955,305.

Specification of Letters Patent.     Patented Apr. 19, 1910.

Application filed January 15, 1909. Serial No. 472,454.

*To all whom it may concern:*

Be it known that I, ALBERT W. BAILEY, a citizen of the United States, residing at Stewardson, in the county of Shelby, and State of Illinois, have invented certain new and useful Improvements in Wind-Motors, of which the following is such a full, clear, and exact description as will enable others skilled in the art to which it appertains to make and use my said invention.

My invention relates to wind motors of that class which have wings or fans adapted to be feathered so as to be fully exposed to the wind pressure on one side of the motor during the turning of the wind-wheel and almost entirely withdrawn from the wind pressure during other periods of revolution of the wind wheel, and hence adapted to utilize to a maximum extent wind pressure effective to turn the wind-wheel in the desired direction and minimizing the effect of the wind pressure tending to retard the turning of the wind-wheel.

The purposes of my invention are to provide improved means for bringing the wind-wheel into action and holding it against the wind; to provide improved means for successively feathering the wings of the wind-wheel while in action; and to provide improved means for placing the wind wheel out of action, with the wings in such position that the wind pressure on the wings will be at the minimum when the wind-wheel is at rest.

With these ends in view, my invention consists in the novel features of construction and combinations of parts shown in the annexed drawings to which reference is hereby made, and hereinafter particularly described and finally recited in the claims.

Figure 7:
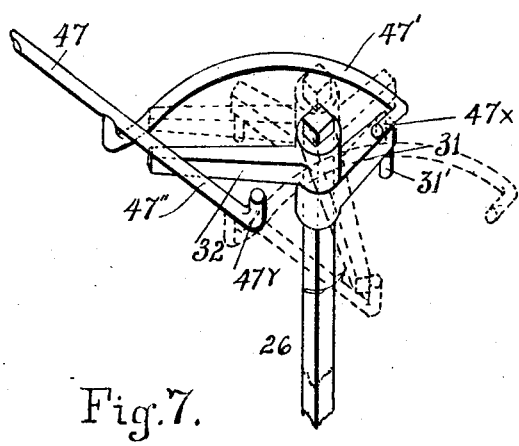
Figure 6:
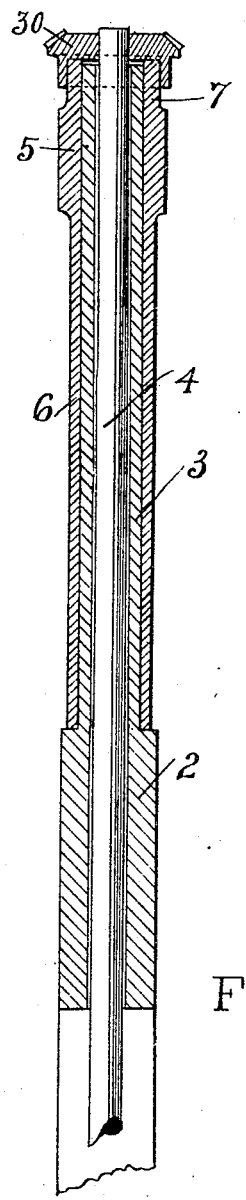

Figure 1 is a side elevation of the complete motor; Fig. 2 is an enlarged top plan of the motor; Fig. 3 is a horizontal transverse section on the line Y. Y. of Fig. 1; Fig. 4 is a horizontal transverse section on the zig-zag line X. X. of Fig. 1; Fig. 5 is an enlarged partial side elevation and sectional view of the upper part of the wind motor; Fig. 6 is an enlarged vertical section on the line Z. Z. of Fig. 1; and Fig. 7 is an enlarged isometric view of the controller shaft, the arms connected with the shaft and the rod connected with and operating the buggy brace; and shows in dotted lines the raised and the revolved positions of the controller arms, and the changed position of said rod after it has been pulled outward to break the buggy brace.

Similar reference numerals and characters designate like parts in the several views.

The standard 1 may be of any suitable construction. A bracket 2 suitably secured on the standard has an integral upwardly extending tubular hub 3. A vertical shaft 4 extends upward through the tubular hub 3, and the wind-wheel frame is fixed near the upper end of said shaft, and the lower end of the shaft may be geared in any usual or suitable manner to operate a pump or other mechanism actuated by the motor. The tail-block 5 has a tubular sleeve 6 surrounding the hub 3 and the tail-block turns on the hub; it also has an upwardly extending hub 7. A bevel cog-wheel 30 is fixed on the hub 7. The tail 9 is firmly fixed on the tail-block 5. Integral with the block 5 is an arm 10. A T-shaped gravitating lever 8 is oscillative on a bolt 12 on the arm 10. A weight 13 is slidable on the gravitating lever 8 and has a set screw 14 serving to secure the weight in different positions in which it may be set on the lever. The two-fold purpose of the weight 13 is to balance the tail and to actuate the controller mechanism for putting the wind-wheel out of action. A U-shaped lever 15 is mounted to oscillate on a bolt 16 extending through the standard 1. Cords 17 and 49 connected with the lever 15 serve to operate the lever and the cords may be hitched on suitably placed pins 18 on the post 1 to hold the lever in different positions in which it may be set. A ring 19 surrounds the sleeve 6. Rods 20 connect the ring 19 with the lever 15 in such manner that the depressing of the outer end of the lever 15 will cause the ring 19 to slide upward on the sleeve 6 and the raising of the outer end of the lever will cause the ring to slide downward on the sleeve. A rod 21 is pivotally connected with the horizontal member 8' of the lever 8 and has at its lower end a hook 22 hooking under the ring 19. The hook 22 hangs loosely in the ring 19 so that the hook may travel around inside of the ring, so as not to interfere with the turning of the tail to keep the wheel against the wind. At the juncture of the rods 20 with the ring 19 are goose-necks 20', of such form that the point of the hook will pass under the goose-necks when the hook is traveling around inside of the ring. A lever 23 is pivotally connected with the tail 9 and the free end of the lever rests on the ring 19. A spool 24 is mounted to turn in bearings 25 fixed on the tail 9, and has a longitudinal polygonal hole accommodating a polygonal shaft 26 which is slidable in said hole. At the lower end of the shaft 26 is a pivot 26' (Fig. 5,) which turns and slides in a longitudinal slot 23' in the lever 23, so that when the lever is raised it will cause the shaft to move vertically without interfering with the turning of the shaft.

While I prefer to use the means shown and described for connecting the shaft 26 with the lever 23, any other suitable connecting device of such construction that the lever may raise the shaft without interfering with its turning, may be used within the scope of my invention. An arm 27, called the lower controller arm, is fixed on the shaft 26. A rod 28 connects the arm 27 with the vertical member 8'' of the lever 8. The arm 27 is fixed in such position on the shaft 26 that when the weight 13 occupies the horizontal position shown by full lines in Fig. 1, the rod 28 will be practically in line with the arm 27, or just enough out of line so that the end of the arm 27 will bear against a fixed stop 29, on the tail 9, and prevent the weight from gravitating and acting to turn the shaft 26 clock-wise. An upper controller arm 32 and an intermediate controller arm 31 are fixed on the shaft 26. The arm 31 has a downwardly extending finger 31'. The frame of the wind-wheel comprises two parallel sets, of horizontal radial arms 33. The arms of each set are equi-distant and are fixed on the shaft 4. Vertical wing-shafts 34 turn in suitable bearings 34' on the arms 33. Wings 35 are fixed on the shafts 34 respectively. The wings 35 may be of canvas, or sheet metal, or other suitable material. A bevel-pinion 36 is secured on one of the shafts 34. A horizontal counter-shaft 37 turns in suitable bearings 38 on one of the arms 33. Bevel-pinions 39 and 40 are secured on the shaft 37. The bevel-gear 39 is one-half the diameter of and meshes with and is driven by the bevel cog-wheel 30. The bevel gear 40 is the same size as and meshes with and drives the bevel gear 36. Cranks 41, 41$^a$, and 41$^b$ are respectively connected with the vertical wing-shafts 34, by set screws 42, so that the cranks may be properly adjusted relative to each other on the shafts. The central part of a rocking-bar 43 is pivotally connected with the crank 41. A connecting rod 44 is pivotally connected with one end of the bar 43, and with the crank 41$^a$; a similar connecting rod 44' is pivotally connected with the other end of the rod 43 and the crank 41$^b$; and a similar connecting rod 44'' connects the cranks 41$^a$ and 41$^b$. A hinged buggy brace 45 is pivotally connected with the rocking-bar 43 and the rod 44, the connection with the rod 43 being between the central pivot and one of the outer pivots of said rod. The cranks 41, 41$^a$, and 41$^b$, and the rods connecting the same are situated in a horizontal plane below the cog-pinions 36 and 40 so that the movement of the cranks and connected parts may be unobstructed. Springs 46 connect the hinged brace 45 with the bar 43 and the rod 44 and act to normally keep the brace extended. A controller rod 47 is slidable in an eye 48 on the rod 44', and has at one end branching members 47' and 47'', and the other end of said rod has a hinge connection with the hinged brace 45. The members 47' and 47'' are in different horizontal planes, and coöperate with the arms 31 and 32 respectively, as hereinafter explained. The member 47' is below the member 47'' and has a lateral inwardly extending finger 47$^x$. The member 47'' has an upwardly extending finger 47$^y$.

When the wind wheel is facing the wind and in operation, the wind acting on the wings 35 will cause the frames 33 to turn the shaft 4, counter-clockwise and the turning of the frames will cause the pinion 39 running on the wheel 30 to rotate the horizontal counter-shaft 37 and through the instrumentality of the pinions 40 and 36, rotate clockwise one of the vertical wing-shafts 34, and the rotating of said wing-shaft 34 will, through the instrumentality of the connecting devices 43, 44, 44', and 44'', actuate the other vertical shafts 34 and the wings connected therewith, so that during the anti-clockwise turning of the wind-wheel frames the wings will turn clock-wise between said frames; the gear wheels and connecting devices connecting the wings being so arranged that the wings will be feathered or turned with their edges to the wind during part of the revolution of the wind-wheel frames, and the surface of each of the wings will, in succession, be presented in position for the most effective action of the wind.

When the motor is not in use it is desirable that the wings be set in such position that the wind will blow between the wings without acting on the surface thereof. If the motor is running and it be desired to put the wind-wheel out of action it is only necessary to pull downward the cord 17. The pulling downward of the cord 17 will cause the lever 15 to raise the rods 20 and the connected ring 19 to the position indicated by dotted lines in Fig. 1, and the ring, as it rises, acting on the free end of the lever 23, will cause it to push upward the polygonal controller shaft 26, sufficiently for the arm 31 to occupy a position above the plane of travel of the member 47' of the rod 47.

When the arm 31 is raised as described and the wind-wheel is turning counter-clock-wise the rod 47 will move in a horizontal plane around the axis of the shaft 4, and the finger 31' will extend downward across the path of the hook 47ˣ, of the member 47', and as the wheel continues to turn, the hook 47ˣ on the member 47', will engage with the finger 31' of the arm 31 and will pull on the arm to cause it to turn the controller shaft 26 counter-clock-wise far enough to cause the arm 27 to travel in the same direction a distance sufficient to carry the pivotal connection 28' of the arm 27 and the rod 28, away from the common line of centers; whereupon the weight 13, will come into action and the weighted lever 8 will gravitate to the position shown by dotted lines in Figs. 1 and 5, to cause the member 8'' to push the rod 28 to the right, and the rod acting on the arm 27 will further rotate the controller shaft 26 counter-clock-wise, to cause the arm 32 (Figs. 2 and 7) to travel quickly counter-clock-wise, above the member 47'', and the arm 32 will engage with the upwardly extending finger 47ʸ, of the member 47'' and will thereby jerk the rod 47, and cause it to pull on and "break" the buggy brace 45, so that the cranks 41, 41ᵃ and 41ᵇ will be quickly turned to occupy such position that the wings 35 will lie parallel to each other, and parallel to the tail of the machine when the motor is facing the wind as indicated by dotted lines in Fig. 2, and will stop in that position, so that the wind will pass between the wings without acting on the surface thereof.

To bring the motor again into action it is only necessary to pull downward on the cord 49 connected with the lever 15, and thereby cause the rods 20 to move downward and cause the ring 19 to pull on the hook 22 so that the rod 21 pulling on the horizontal member 8' of the lever 8 will turn the lever and raise the weight 13 to a horizontal position, and cause the rod 28 to stop in line with the lower controller arm 27, as shown in Fig. 2, so that the weight will be supported on the dead center as already described. The cord 17 will then be pulled downward sufficiently to raise the ring 19 slightly above the hook 22 so that the hook may turn within the ring and not interfere with the turning of the motor on the standard to face the wind. Upon the lowering of the ring 19 the free end of the lever 23 will follow the ring and will thereby permit the controller shaft 26 and connected parts to gravitate to their initial position; whereupon the springs 46 (Fig. 2) will act on the members of the brace 45 to extend the brace and thereby restore to their initial positions the rods 43, 44, 44' and 44''; the cranks 41, 41ᵃ and 41ᵇ and the wings 35.

From the foregoing it will be seen that each of the wings is revoluble on its own vertical axis, and all the wings have a planetary movement around the axis of the main shaft 4, so that the broad surface of each wing in succession is presented to the wind, and the wings are successively feathered as they turn, to present the edge of each wing to the wind and turn its broad surface away from the wind; and by reason of this construction maximum efficiency is attained.

Having fully described my invention, what I claim as new and desire to secure by Letters Patent, is:

1. In a wind motor, the combination of a revoluble main shaft, frames secured on said shaft, wing shafts mounted to rotate in bearings on said frames, wings fixed on said wing shafts respectively, cranks fixed on said wing shafts respectively, a planetary gear connected to rotate one of said wing shafts, rods connected to operate the cranks of said wing shafts to feather said wings in succession, rods connecting said cranks and a buggy brace connecting said rods and co-operating to put said wings out of action, a weight in operative relation to said means for putting the wings out of action and adapted to gravitate, means for holding the weight in its raised position, means for releasing the weight, and means connecting said weight with the means for putting the wings out of action in such manner that the gravitating of the weight will bring into action the means for putting the wings out of action.

2. In a wind-motor, the combination of a standard, a bracket secured on said standard and having a tubular hub, a tail-block having a sleeve turning on the tubular hub of said bracket, a tail fixed on said tail-block, a weighted lever pivotally supported on said tail-block, a ring surrounding the sleeve of said tail-block and connected with said weighted lever, means connecting said ring with said weighted lever means for sliding said ring downward to turn said weighted lever on its pivot to raise it to its horizontal position and sliding the ring upward to permit the weighted member of said lever to gravitate downward, a controller mounted on said tail, and a lever connected with said tail and movable by said ring to actuate said controller.

3. In a wind-motor, the combination of a standard, a bracket fixed on said standard and having a tubular hub, a tail-block having a sleeve turning on the hub of said bracket and also having a hub, a bevel cog-wheel fixed on the hub of said tail-block, a weighted lever pivotally supported on said tail-block and having horizontal members and a vertical member, a weight adjustable on one of the horizontal members of said lever, a rod connected with the other horizontal member of said lever and having a hook, a vertically movable ring surrounding the sleeve of said tail-block and engaging with the hook of said hooked rod, a tail fixed on said tail-block, a lifting lever pivotally connected with said tail-block and having its free end supported on said ring, means for raising and lowering said ring, spool-bearings fixed on said tail, a spool revoluble in said spool-bearings, a polygonal shaft extending through and slidable in said spool and supported on said lifting lever, a main shaft extending through the tubular hub of said bracket, frames fixed on said shaft, counter-shaft bearings fixed on one of said frames, a counter-shaft mounted to turn in said counter-shaft-bearings, wing-shaft-bearings fixed on said frames, wing-shafts parallel to said main shaft and mounted to turn in said wing-shaft-bearings, wings fixed on said wing-shafts respectively, cranks secured on said wing-shafts respectively, a bevel gear secured on one of said wing-shafts, a bevel gear secured on said counter shaft and meshing with the bevel cog-wheel on the hub of said tail-block, a second bevel gear secured on said counter shaft and meshing with the bevel gear on one of said wing-shafts, a rocking bar pivotally connected with one of said cranks, connecting rods respectively connecting the ends of said bar with two of said cranks, a connecting rod connecting said last named cranks with each other, a hinged buggy brace connected with said rocking bar and one of said connecting rods, a slidable controller rod having branching members and connected with said buggy brace, arms fixed on said polygonal shaft and adapted to respectively engage the branching members of said controller rod, another arm fixed on said polygonal shaft, a rod connected with and in line with said last named arm and connected with the vertical member of said weighted lever and resting on a dead center when the motor is in operation, and so connected that when said polygonal shaft is raised said last named arm will move off the center and the weighted lever will gravitate to cause the turning of the polygonal shaft to move said last named arm into such position that one member of the controller rod will be engaged by one of said first named arms to pull on said controller rod and thereby break said buggy brace to change the relation of the cranks as described.

4. In a wind motor, the combination of a revoluble main shaft, a wind-wheel secured on said shaft and having turnable wings, means for turning said wings to put them out of action, a tail oscillative on the axis of said main shaft, a controller mounted on said tail and connected to control the means for putting the wings of said wind-wheel out of action, a lever having a weighted member and mounted to oscillate on said tail block, means for supporting said weighted lever in its raised position, means for releasing said weighted lever, and a connecting device connecting said weighted lever with said controller to actuate said controller upon the gravitating of the weighted member of said lever.

In witness whereof I have hereunto signed my name at Stewardson, Illinois, this 9th day of January, 1909.

ALBERT W. BAILEY.

Witnesses:
  JOHN W. BAILEY,
  J. G. McINTOSH.